United States Patent [19]

Donnally et al.

[11] 4,253,192
[45] Feb. 24, 1981

[54] TELEMETRIC SYSTEM

[75] Inventors: William Donnally, Mine Hill; David N. Everswick, Succasunna, both of N.J.

[73] Assignee: The United States of America as represented by the Secretary of the Army, Washington, D.C.

[21] Appl. No.: 9,003

[22] Filed: Feb. 5, 1979

[51] Int. Cl.$^3$ .............................................. H04B 3/60
[52] U.S. Cl. ............................... 455/98; 340/870.28; 340/870.31
[58] Field of Search ................... 325/113, 115, 31, 64, 325/13, 376, 379; 340/177 R, 18 D, 189 R, 181, 189 M, 207 R, 208, 195, 196; 244/3.1, 3.14; 455/41, 95, 96, 98, 269, 274

[56] References Cited

U.S. PATENT DOCUMENTS

| | | | |
|---|---|---|---|
| 2,931,897 | 4/1960 | Tuve et al. | 455/98 |
| 3,024,453 | 3/1962 | Ransom | 340/195 |
| 3,038,154 | 6/1962 | Zworykin et al. | 455/98 |
| 3,548,314 | 12/1970 | Mitchell | 325/113 |
| 3,555,502 | 1/1971 | Davis | 325/113 |
| 3,641,538 | 2/1972 | Whitney et al. | 325/113 |
| 3,906,356 | 9/1975 | Manabe et al. | 340/196 |
| 4,065,753 | 12/1977 | Paul, Jr. | 325/115 |
| 4,119,913 | 10/1978 | Everswick | 325/113 |

FOREIGN PATENT DOCUMENTS 616202  9/1958  Italy ........................................ 325/113

Primary Examiner—Benedict V. Safourek
Assistant Examiner—Tommy P. Chin
Attorney, Agent, or Firm—Nathan Edelberg; Robert P. Gibson; Max Yarmovsky

[57] ABSTRACT

A telemetric system has a conductive coil positioned adjacent to a muzzle. A burst of transducer data is electromagnetically relayed to the conductive coil from a missile after it is fired. This conductive coil has longitudinally spaced windings distributed alongside the trajectory of the missile. The effective length of the conductive coil is at least in the order of magnitude of the distance traveled by the missile while the burst of transducer data is being transmitted. Data thus received can be utilized to drive recorders or similar equipment. The missile has on its outside an associated missile coil for transmitting the burst of transducer data. The coil is driven by a modulated carrier. This modulation is provided by a delay device that is driven by a transducer. This arrangement allows transmission of data corresponding to an operating parameter of the missile after a predetermined delay.

17 Claims, 3 Drawing Figures

U.S. Patent      Feb. 24, 1981      4,253,192
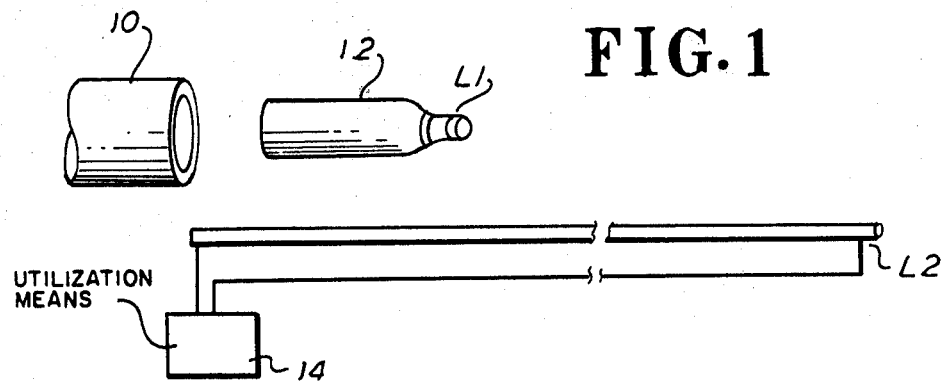
FIG. 1
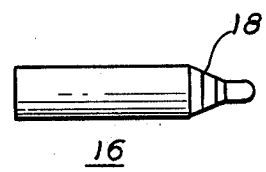
FIG. 2
FIG. 3
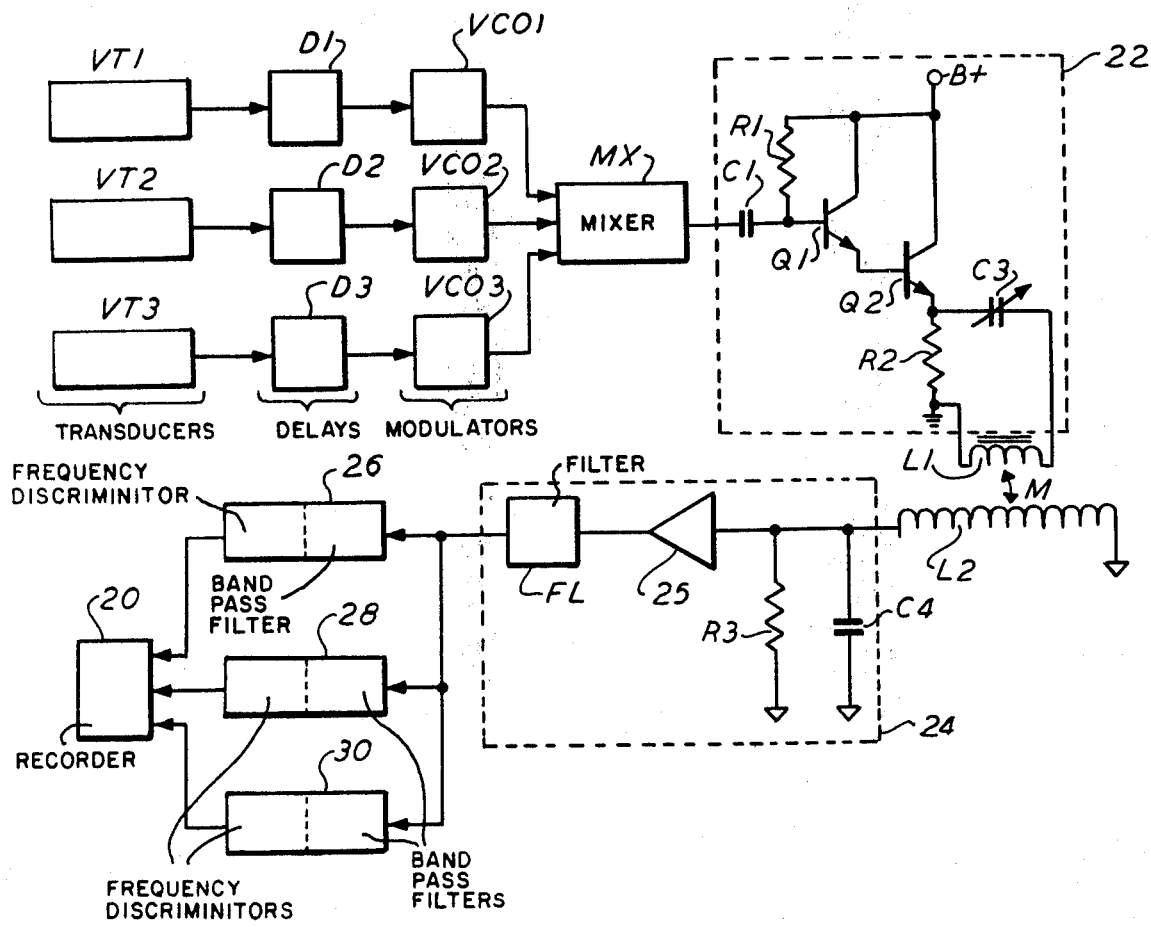

TELEMETRIC SYSTEM

GOVERNMENTAL INTEREST

The invention described herein may be manufactured used and licensed by or for the government for governmental purposes without the payment to us of any royalties thereon.

BACKGROUND OF THE INVENTION

The present invention relates to telemetric systems and in particular to systems employing an elongated coil.

Conventional telemetry has employed a radio frequency (r.f.) link to relay data from a missle. Such systems employ a plurality of subcarriers at different frequencies, each frequency being modulated by an associated transducer that measures a parameter of the missile, such as the acceleration or stress. These subcarriers are combined and used to modulate an r.f. carrier which is then transmitted from the missile by means of an antenna. A conventional ground receiving station receives the r.f. carrier and separates the various subcarriers by using well-known frequency division demultiplexing techniques. A disadvantage with equipment of this type is that the circuitry required to process r.f. signals can be expensive and unreliable. Moreover, gun gas or other interfering atmospheric conditions can effectively block transmission of r.f. energy. In addition destructive interference caused by reflection of r.f. energy from the gum can interrupt transmission. In the situation where the telemetric data need only travel a relatively short distance and is only transmitted for a short interval, the expense and unreliability associated with a conventional r.f. link is unnecessary.

The present invention provides a reliable, efficient and inexpensive telemetric system by employing an elongated conductive coil whose length corresponds to the distance traveled by a missile during the transmission of a burst of transducer data. This coil is located adjacent to a muzzle to obtain data immediately upon the exiting of the missile therefrom. An associated transmitting means employs a modulator which is driven by a transducer through a delay means. The modulator drives a missile coil at a carrier frequency of less than one megaHertz, preferably. Using equipment of this nature, expensive and unreliable high frequency techniques are avoided and potential interference such as ionized gun gas does not block the telemetering function. In addition destructive interferences caused by the reflections from the gun tube is reduced considerably by using relatively long wavelengths (low frequency).

SUMMARY OF THE INVENTION

In accordance with the illustrative embodiments demonostrating features and advantages of the present invention, there is provided a means for receiving a burst of transducer data. This means is employed in a telemetric system for electromagnetically relaying this burst of transducer data from a missile after it is trajected from a muzzle into a given trajectory. The means for receiving includes: a conductive coil and a utilization means. The conductive coil is positioned adjacent to the muzzle and has longtudinally spaced windings distributed alongside the trajectory. The effective length of the conductive coil is at least in the order of magnitude of the distance traveled by the missile during the transmission of the burst of transducer data. The utilization means is coupled to the conductive coil and responds to the burst of transducer data.

An associated apparatus which is the illustrative embodiment cooperates with the above mentioned means for receiving and which is an accessorial part of the present invention is a means for transmitting. This means for transmitting is mounted in said missile for transmitting the burst of transducer data. This means for transmitting includes a transducer for producing a data signal responsive to an operating parameter of the missile. Also included is a modulator means that has a data input terminal, for producing a carrier signal modulated in response to signals applied to this data input terminal. The means for transmitting further includes a delay means for coupling the data signal to the data input terminal after a predetermined delay. This predetermined delay corresponds to a launching interval during which the missile accelerates to and exits from the muzzle. Also included is a missile coil mounted on the outside of the missile and driven by the carrier signal at a carrier frequency of less than one megaHertz.

BRIEF DESCRIPTION OF THE DRAWINGS

The above brief description as well as further objects features and advantages of the present invention will be more fully appreciated by reference to the following detailed description of presently preferred but nonetheless illustrative embodiments in accordance with the present invention when taken in conjunction with the accompanying drawings wherein:

FIG. 1 is an isometric schematic view of a missile being fired from a muzzle into a trajectory which is alongside a conductive coil, in accordance with the instant invention;

FIG. 2 is a side view of a missile which is an alternative to that shown in FIG. 1;

FIG. 3 is a schematic illustration, partly in block form, of a means for receiving and a means for transmitting in accordance with the instant invention.

DETAILED DESCRIPTION OF THE PREFERRED EMBODIMENT

Referring now specifically to the drawings, in FIG. 1 there is shown a muzzle 10 which is part of a gun that has just launched missile 12. Encircling the forward end of missile 12 is annularly shaped missile coil L1. Coil L1 comprises a plurality of wires wound coaxially on the outside of missile 12. The number of turns and the thickness of wire employed is chosen to provide the inductance, power handling capability etc. required by the particular embodiment. While wire is mentioned, it is anticipated that, for some embodiments, flat metal laminations which are laid helically upon an annular insulator on the surface of missile 12 may be employed instead. Moreover, since the metal flight body of missile 12 acts as a magnetic core, the missile coil may be comprised of several longitudinally spaced segments.

Positioned alongside the trajectory of missile 12 is conductive coil L2. Coil L2 is connected to utilization means 14 which is described in further detail herein. Also described in further detail herein is missile circuitry which is connected to missile coil L1. Coil L2 is fabricated from a helical arrangement of wire which is wound around a non-magnetic core such as wood or air. The number of turns required for L2 depends on the self-inductance required of L2 as well as the mutual inductance desired between missile coil L1 and conductive coil L2. In the constructed embodiment coil L2 had several hundred turns. For the same reasons that there are many alternate embodiments for missile coil L1, there are similar alternate embodiments for conductive coil L2.

In the preferred embodiment, the effective length of coil L2 is equal to the distance traveled by missile 12 while it is transmitting a burst of transducer data, plus an additional element of length corresponding to the settling time of the coils L1 and L2. As explained further herein the duration of the burst of transducer data in the preferred embodiment corresponds to the transit time for missile 12 through the gun bore to muzzle 10.

The settling time is that time required for the initial transients caused by missile 12 arriving near coil L2 to subside to a substantially negligible amount. For example, if missile 12 transmits a burst of data for 12 milliseconds after an initial settling time of 3 milliseconds and assuming that the speed of missile 12 is 1500 feet per second, then the preferred effective length of coil L2 is 22.5 feet (1500 feet per second ×0.015 seconds). Accordingly, coil L2 is sufficiently long so that during a settling interval and during a burst of transducer data, missile coil L1 is coupled to and alongside a portion of coil L2. Therefore, the coil L1 and L2 exhibit a mutual inductance or transformer action so that data is electromagnetically coupled therebetween. It is noted that the foregoing refers to effective length by which is meant the length that coil L2 appears to have with respect to its ability to receive data from coil L1 as it moves by coil L2.

It is appreciated that in some alternate embodiments the length of coil L2 can differ by an order of magnitude. For example, in some embodiments the initial transients will not be sufficient to require a segment of length for settling. In some embodiments only a subinterval of the missile data will be needed so that the coil L2 can be correspondingly shortened. In other embodiments coil L2 will much longer to allow for variations in muzzle velocity or settling time. The length of coil L2 is however chosen to provide electromagnetic coupling between the missile coil L1 and the coil L2 for a time interval sufficient to telemeter the relevant data generated within missile 12.

It is anticipated that the diameter of coil L2 will be 1 to 2 inches in many embodiments and that it will be parallel to and spaced from the trajectory of missile 12 by 2 to 6 feet in many embodiments. It is apparent, however, that these dimensions can be varied considerably to account for the inductance, driving frequency, mutual inductance, power level, etc. of the coils employed. Since it is preferred that the frequency of the electromagnetic energy radiating between missile coil and ground coil be less than one megaHertz, it is desirable to position coil L2 in the proximity of the trajectory of missile 12. Using a frequency of this magnitude, disturbances caused by ionized gun gas, reflections or other atmospheric disturbances do not substantially interfere with the transmission between missile and ground station.

Referring to FIG. 2 a missile alternative to that shown in FIG. 1 is illustrated. The missile 16 comprises an annular coil 18 coaxially mounted on the surface of missile 16. Essentially, coil 18 has been mounted more aftwardly in comparison to the position of the coil shown in FIG. 1. It is apparent that other positions for the missile coil besides the two positions shown in FIGS. 1 and 2 will operate satisfactorily.

Referring to FIG. 3, a means for receiving is shown herein as previously mentioned conductive coil L2 and a utilization means comprising recorder 20 and circuits 24, 26, 28 and 30. Recorder 20 is a magnetic tape recorder which stores the information generated from conductive coil L2. While a recorder is shown herein in other embodiments alternative equipment such as a firing control system may be substituted therefor to control subsequent firings. The circuitry coupled between conductive coil L2 and recorder 20 reduces noise and allows separate processing of multiplexed data contained in the burst of transducer data, in a manner described subsequently. Also shown in FIG. 3 is a means for transmitting a burst of transducer data which includes plurality of transducers VT1, VT2 and VT3. Transducers VT1, VT2 and VT3 are well-known measuring devices which are mounted in the missile and are arranged to measure different operating parameters of the missile. For example, these transducers can measure the physical strain in the missile by means of strain gauges, missile acceleration by means of accelerometers, etc. Various other transducers are well-known in the art and may be employed herein within the scope of the present invention. Transducers VT1, VT2 and VT3 are separately connected to delay means D1, D2 and D3, respectively. Delay devices D1, D2 and D3 employ charge-coupled devices, although delay lines or other equipment may be employed instead. Although it is not necessary, these delay devices eventually reproduce the input data at the same rate as it originally occurred. The delay provided is sufficient to delay coupling of transducer data generated during launch until after the missile emerges from the muzzle and certain voltage transients have subsided, as explained further hereinafter.

Delay devices D1, D2 and D3 are separately coupled to modulator means VCO1, VCO2 and VCO3 respectively. The modulator means VCO1, VCO2 and VCO3 are voltage controlled oscillators whose output frequency changes in proportion to the magnitude of voltage supplied at their respective inputs. Accordingly, modulator means VCO1, VCO2 and VCO3 provide frequency modulation. Of course many alternative circuits are known in the art for providing frequency modulation. In addition other forms of modulation may be employed such as: amplitude modulation, phase modulation, pulse code modulation, pulse amplitude modulation, etc. The outputs of modulator means VCO1, VCO2 and VCO3 are coupled to separate inputs of mixer MX. Mixer MX linearly combines the signals supplied by modulator means VCO1, VCO2 and VCO3 to provide an output which is coupled serially to capacitor C1. Mixer MX employs a resistive mixing network. Since the center operating frequencies (zero modulating input) of modulators VCO1, VCO2 and VCO3 are mutually different, the output of mixer MX provides three separate channels of data which are combined onto a single line using the well known frequnecy division multiplexing technique. The output of mixer MX is coupled to missile coil L1 by means of a driver 22. Driver 22 comprises a pair of NPN transistors Q1 and Q2 which are connected in a Darlington configuration with the base of transistor Q1 as the pair input. Capacitor C1 is serially connected between the base of transistor Q1 and the output of mixer MX. Biasing resistor R1 is connected between the base of transistor Q1 and a source of supply voltage as terminal B+. Also connected to this terminal are the collectors of transistors Q1 and Q2. The emitter of transistor Q2 is connected to one terminal of resistor R2 whose other terminal is grounded. The emitter of transistor Q2 is also connected to one terminal of variable capacitor C3 whose other terminal is connected to the ungrounded terminal of missile coil L1.

Thus connected capacitor C3 and coil L1 provide a series-resonant arrangement with a resonance centered in the middle of the subcarrier frequencies provided by mixer MX. The frequency of resonance is calculated by the well-known formula:

$$\frac{1}{2\pi \sqrt{LC}}$$

Missile coil L1 and conductive coil L2 are schematically illustrated in proximity. The mutual coupling between them is schematically indicated by the double headed arrow and reference character M. It should be noted that the ground provided for missile coil L1 is of course different from that for conductive coil L2 since the missile is in free flight with no ohmic connection to the ground station.

Filtering of conductive coil L2 is provided by circuit 24. Circuit 24 is part of a filter means comprising capacitive element C4 which is connected in parallel across both conductive coil L2 and resistor R3. Capacitor C4 is selected with respect to coil L2 is provide a parallel-resonant arrangement whose resonant frequency is in the center of the subcarrier frequencies transmitted to coil L2. This resonant frequency is calculated by the above-mentioned formula. Resistor R3 is provided to adjust the well-known figure of merit Q of the parallel-resonant arrangement. Since bandwidth is inversely proportional to Q resistor R2 can be valued to provide a sufficiently broad bandwidth. The value of Q can be approximated as the ratio of the resistance of resistor R3 to the reactance of coil L2 at resonance. This approximation assumes that the primary dissipation of power during each resonant cycle is in resistor R3. Of course in some embodiments this approximation will not be sufficiently accurate and account must be taken of copper and hysterisis loss, using well-known formulas.

Connected to the ungrounded terminal of missile coil L2 is the input of driving amplifier 25 which is a conventional operational amplifier. Its output drives the input of filter FL which is a conventional bandpass filter using discrete inductors, capacitors and resistors. It is apparent that filter FL supplements the filtering function provided by capacitor C4. Accordingly, in some embodiments filter FL or capacitor C4 may be deleted. In addition, as described hereinafter, filtering may be provided by an input filter of a demodulator driven by coil L2. For some embodiments the input filter of this demodulator has a characteristic similar to that provided by circuit 24. Circuit 24 may be deleted in this latter instance so that the only filter means in the ground station is the input filter of this demodulator.

This demodulator is shown herein as plurality of frequency discriminators 26, 28 and 30 having a plurality of bandpass filters, commonly connected to the output of filter FL. The outputs of discriminators 26, 28 and 30 are separately connected to different inputs of previously-described recorder 20. Frequency discriminators 26, 28 and 30 each provide frequency demodulation of a corresponding signal generated by conductive coil L2. The discriminators include conventional circuitry such as a voltage-controlled oscillator which is connected in a phase-locked loop so that a control voltage is developed which is proportional to the input frequency. Of course, alternative circuits are well-known in the art.

The overall filtering provided by the apparatus of FIG. 3 from the emitter of transmitter Q2 to points thereafter will depend upon the filtering provided by capacitor C3 and coil L1; by capacitor C4 and coil L2; by filter FL; and by the bandpass filters contained within discriminators 26, 28 and 30. It is anticipated that the mutual inductance between coils L1 and L2 will be relatively small with respect to the inductance of these coils individually. Such "loose" coupling will enable the respective resonant frequencies of coils L1 and L2 to be adjusted essentially independently. Thus if capacitor C4 is properly selected to provide the desired resonant frequency with respect to coil L2, capacitor C3 may be adjusted to resonate with inductor L1 within disturbing the resonant frequency of coil L2.

It should be noted in passing that since coil L1 moves with respect to coil L2 there will be a Doppler shift, that is, a change in frequency between the two coils. This shift is equal to the product of missile velocity and coil frequency divided by the speed of light. However, for projectile velocity of about 1,000 meters per second and a coil frequency of 500 kilohertz the Doppler shift is only 1.7 Hertz, an essentially negligible shift. In the constructed embodiment the subcarriers were in the order of 300 kiloHertz.

The frequencies of the subcarriers coupled between coils L1 and L2 will be in the vicinity of the threshold between audio and supersonic frequencies, that is, in the vicinity of 20 kiloHertz. It is anticipated that the subcarriers will be in the range of a few kiloHertz to a few hundred kiloHertz for most embodiments. By using frequencies less than one megaHertz and the disclosed coils, the subcarriers can be transmitted directly without the use of another high frequency r.f. modulator. Such an arrangement simplifies the circuitry and improves reliability. In addition the transmission is not easily interrupted by ionized gun gas. Also, the possibility of reflections causing destructive interference is greatly reduced.

To facilitate an understanding of the principles of the apparatus described in connection with FIGS. 1, 2 and 3, its operation will be briefly described. Assume that missile 12 (FIG. 1) has recently been fired and has therefore just commenced to move. Transducers VT1, VT2 and VT3 produce time-varying signals in response to increased acceleration and stress within the missile. This data is coupled to delay devices D1, D2 and D3 whose outputs do not immediately respond but remain at a constant quiescent value. Therefore the output from mizer MX contains constant or unmodulated subcarriers. Until coil L emerges from muzzle 10 its electromagnetic field is effectively shielded by muzzle 10. Moreover, since the unmodulated subcarriers applied to missile coil L2 are of a relatively low frequency, their propensity to propagate electromagnetic energy is low. Thus the unmodulated subcarriers coupled to coil L1 produce no appreciable effect in coil L2 (FIG. 3).

Upon the emergence of missile coil L1 from muzzle 10 an electromagnetic field is coupled to conductive coil L2. It is noted that the flight body of missile 12 acts as the core for coil L1 while coil L2 is essentially an air-core inductor. This being the case, magnetic lines of force are linked between turns of coil L1 and some of the turns of coil L2. This condition initiates transformer action so that there is a transfer of electromagnetic energy between coil L1 and coil L2. The voltage transfer will be in proportion to the turns ratio. However, it should be observed that not all of the turns of coil L2 are magnetically linked to coil L1. Therefore the magnitude of voltage transferred between coils L1 and L2 will depend to a great extent upon the spacing between them, the turns per inch of coil L2, the carrier frequency employed, etc. When this electromagnetic coupling first occurs a transient of voltage is produced which causes a voltage transient at each of the outputs of discriminators 26, 28 and 30. It should be recalled however that the subcarriers are unmodulated at this time and that the length of coil L2 is sufficient to allow this transient to subside while the missile is traveling alongside coil L2. After this transient subsides the data generated by transducers VT1, VT2 and VT3 at the beginning of the firing of missile 12 (set-back) will finally produce a burst of transducer data from delay devices D1, D2 and D3. The burst of transducer data provided from delay devices D1, D2 and D3 frequency modulates modulators VCO1, VCO2 and VCO3 which operate at different center frequencies and whose outputs are combined in mixer MX (FIG. 3). Mixer MX drives missile coil L1 by means of driving circuit 22. It is appreciated that the use of three separate modulators operating at different frequencies provides three subcarriers which are transmitted on a single line by means of frequency division multiplexing.

In this manner electromagnetic data corresponding to physical phenomenon occurring in the missile 12 (FIG. 1) prior to its emergence from muzzle 10 is coupled to coil L2 after the emergence of missile 12 from muzzle 10. The preferred duration of the burst of transducer data corresponds to the transit time of missile 12 through the gun and out of muzzle 10. This interval is preferred since during it the highest stress, acceleration and velocity occur. If, however, only the first half of this data were required the length of coil L2 could be correspondingly reduced.

Filter 24 (FIG. 3) eliminates stray noise which may occur in adjacent frequency spectrums. Filter 24 can also eliminate a hum which may otherwise be induced into the system from adjacent power lines. The filtered burst of data appearing from the output of filter 24 is commonly coupled to the inputs of discriminators 26, 28 and 30. Each of these discriminators, having its own internal filter, selects one of the different subcarriers frequencies previously described and demodulates it. In this manner there is provided at the output of each of the discriminators 26, 28 and 30 a voltage whose magnitude is a replica of the voltages produced by transducers VT1, VT2 and VT3 prior to the emergence of missile 12 (FIG. 1) from muzzle 10. This data is coupled into recorder 20 which stores this data for analysis of the stresses, acceleration and other operating parameters which occurred in the missile during firing.

After missile coil L1 travels beyond the effective range of coil L2, coil L2 no longer produces transducer data, thus the burst of transducer data terminates. It is expected that transducer-modulated subcarriers will still be applied to missile coil L1 thereafter but that these signals concern events occurring within the missile after it emerged from muzzle 10 and is not deemed part of the burst of transducer data. This subsequent data is not telemetered in the preferred embodiment, although it could were coil L2 lengthened.

It is appreciated that numerous modifications can be implemented with respect to the circuitry and equipment described above. For example, systems can be designed which have more transducers and subcarriers. Alternatively, systems can be designed having only one transducer and one subcarrier. In the latter instance, the filtering requirements and the duplication of subsystems, is significantly reduced. Moreover, the dimensions, physical location and mounting of coils L1 and L2 (FIG. 1) can be varied considerably to provide a desired amount of coupling. In addition, it is anticipated that in some embodiments coil L2 will be mounted on muzzle 10, but that is other embodiments it will be mounted on the ground or nearby structures. Obviously many other modifications and variations of the present invention are possible in light of the above teachings. It is therefore to be understood that within the scope of the appended claims the invention may be practiced otherwise than specifically described.

What is claimed is:

1. In a telemetric system for electromagnetically relaying in-bore transducer data from a missile after it is trajected from a muzzle into a given trajectory, comprising:
   means for receiving said transducer data after a predetermined delay corresponding to a launch interval of said missile; which includes;
   a conductive coil positioned adjacent to said muzzle and having longitudinally spaced windings distributed alongside said trajectory, the length of said conductive coil being equal to or greater than the distance traveled by said missile during the transmission of said transducer data; and
   utilization means coupled to said conductive coil and responsive to said transducer data.

2. In a telemetric system according to claim 1 wherein said effective length of said conductive coil is at least the distance traveled by said missile during the transmission of said burst of transducer data.

3. In a telemetric system according to claim 2 wherein said utilization means comprises:
   a filter means for passing frequency components within a predetermined spectrum produced from said conductive coil.

4. In a telemetric system according to claim 3 wherein said filter means comprises:
   a plurality of bandpass filters, each having a bandpass spectrum centered about a different frequency, whereby said utilization means provides frequency division demultiplexing.

5. In a telemetric system according to claims 3 or 4 wherein said filter means passes frequency components in a range having values of less than one megaHertz.

6. In a telemetric system according to claim 5 wherein said filter means passes frequency components produced by said conductive coil in a range having values in the order of magnitude of the threshold between audio and supersonic frequencies.

7. In a telemetric system according to claim 3 wherein said filter means comprises:
   a capacitive element coupled across said conductive coil in a parallel-resonant arrangement.

8. In a telemetric system according to claim 5 further comprising:
   a plurality of frequency discriminators each operative to detect frequency modulation and each driven by a corresponding one of said plurality of bandpass filters.

9. In a telemetric system for electromagnetically relaying in-bore transducer data from a missile after it is trajected from a muzzle into a given trajectory comprising:
- means mounted in said missile for transmitting said transducer data after a predetermined delay corresponding to the launch interval of said missile which includes;
- a plurality of transducers for producing a data signal responsive to an operating parameter of said missile;
- modulator means having a data input terminal for producing a carrier signal modulated in response to signals applied to said data input terminal;
- delay means for coupling said data signal to said data input terminal after a predetermined delay corresponding to a launching interval during which said missile accelerates to and exits from said muzzle; and
- a missile coil mounted on the outside of said missile and driven by said carrier signal at a carrier frequency of less than one megaHertz and having a Q value adjusted to provide broadband width;
- a conductive coil inductively coupled to said missile coil and adjusted to have said Q value of said missile coil, positioned adjacent to said muzzle and having longitudinally spaced windings distributed alongside said trajectory, the length of said conductive coil being equal to or greater than the distance traveled by said missile during the transmission of said transducer data; and
- utilization means coupled to said conductive coil and responsive to said transducer data.

10. In a telemetric system according to claim 9 wherein said missile coil is wound about the central longitudinal axis of said missile.

11. In a telemetric system according to claim 10 wherein said modulator means provides frequency modulation.

12. In a telemetric system according to claim 11 further comprising a capacitor coupled to said missile coil in a series-resonant arrangement.

13. In a telemetric system according to claim 12 wherein said utilization means comprises:
- a filter means for passing frequency components within a predetermined spectrum produced from said conductive coil.

14. In a telemetric system according to claim 13 wherein said filter means passes frequency components in a range having values of less than one megaHertz.

15. In a telemetric system according to claim 14 wherein said filter means passes frequency components produced by said conductive coil in a range having values in the order of magnitude of the threshold between audio and supersonic frequencies.

16. In a telemetric system according to claim 17 wherein said filter means comprises:
- a capacitive element coupled across said conductive coil in a parallel-resonant arrangement.

17. In a telemetric system according to claim 9 wherein said carrier frequency is in the order of magnitude of the threshold between audio and supersonic frequencies.

* * * * *